United States Patent [19]

Schnabel

[11] 4,097,914
[45] Jun. 27, 1978

[54] SOLID ELECTROLYTE CAPACITOR

[75] Inventor: Werner Schnabel, Nattheim, Germany

[73] Assignee: Siemens Aktiengesellschaft, Berlin & Munich, Germany

[21] Appl. No.: 664,264

[22] Filed: Mar. 5, 1976

[30] Foreign Application Priority Data

Mar. 5, 1975 Germany .......................... 2509613

[51] Int. Cl.² ............................................. H01G 9/00
[52] U.S. Cl. ................................................. 361/433
[58] Field of Search ..................... 317/230; 29/570; 361/433

[56] References Cited

U.S. PATENT DOCUMENTS

| 3,254,390 | 6/1966 | Shtasel ............... 317/230 X |
| 3,581,159 | 5/1971 | Piper et al. ............ 317/230 |
| 3,614,544 | 10/1971 | Mosebach et al. ........ 317/230 |
| 3,970,903 | 7/1976 | Shiru .................. 361/433 |
| 4,017,773 | 4/1977 | Cheseldine ............. 361/433 |

*Primary Examiner*—Stanley D. Miller, Jr.
*Assistant Examiner*—James W. Davie
*Attorney, Agent, or Firm*—Hill, Gross, Simpson, Van Santen, Steadman, Chiara & Simpson

[57] ABSTRACT

An electrolyte capacitor and method with the capacitor having an anode coated with a dielectric oxide layer and a cathode consisting of a semiconductive metal oxide. A graphite layer is formed on the cathode and an additional semiconductive metal oxide is disposed on the cathode in and between the graphite particles forming the graphite layer.

10 Claims, 7 Drawing Figures

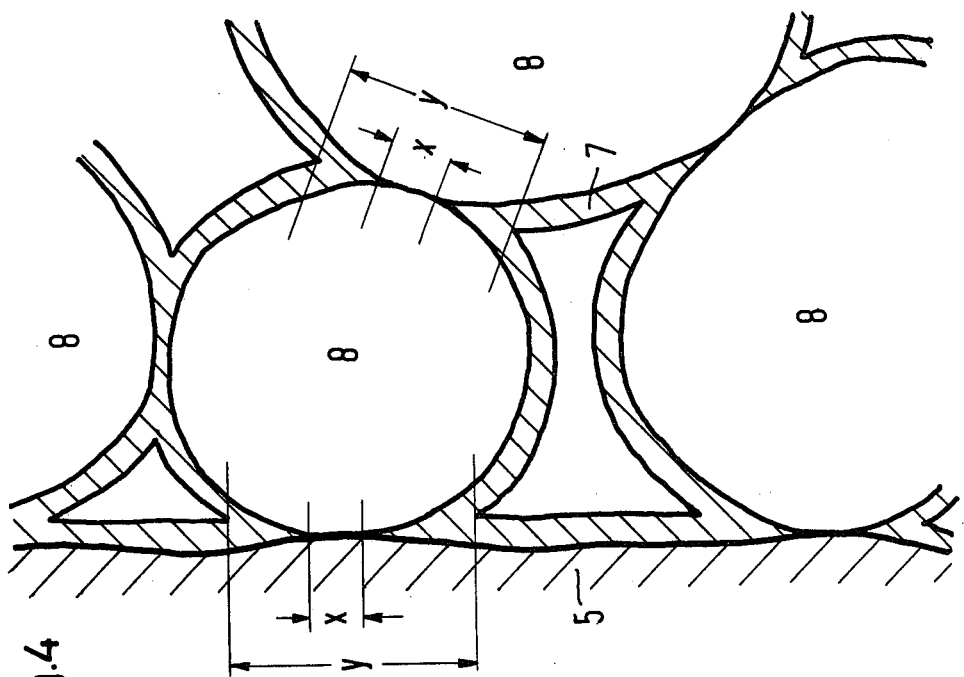
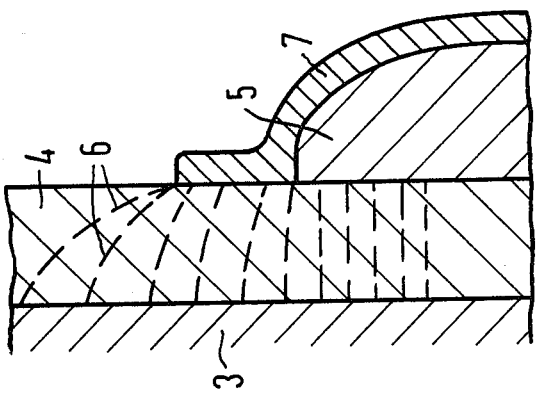
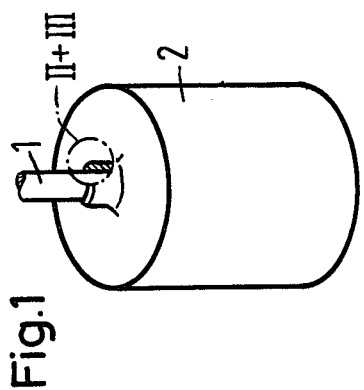
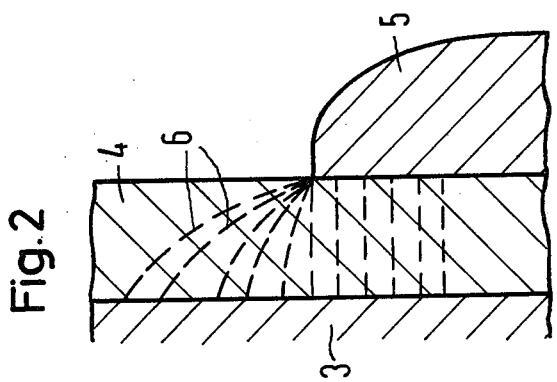

SOLID ELECTROLYTE CAPACITOR

FIELD OF THE INVENTION

The field of art to which this invention pertains is electrolyte capacitors and methods of making the same and in particular to arrangements for improving the electrical characteristics with respect to leakage currents, impedance and dissipation factors.

SUMMARY OF THE INVENTION

It is an important feature of the present invention to provide an improved electrical capacitor.

It is another feature of the present invention to provide a method of making an improved electrical capacitor having desired electrical values.

It is a principle object of the present invention to provide a solid electrolyte capacitor having an anode and cathode, with a cathode consisting of a semiconductive metal oxide with a graphite layer disposed thereon and wherein an additional semiconductive metal oxide is disposed on the cathode in and between the graphite particles of the graphite layer.

It is a further object of the present invention to provide a capacitor as described above wherein the additional layer is formed of a variety of metal oxides as set forth in the specification.

It is an important object of the present invention to provide a method for producing a solid electrolyte capacitor as described above wherein the additional layer is formed by dipping the capacitor in a bath containing a metal in a pyrolytically decomposable compound from which the additional layer is to be produced and causing pyrolytic decomposition to form said additional layer.

An additional object of the present invention is to provide a method as described above in which a silver-conductive-lacquer-layer is applied to the capacitor prior to the forming of the additional layer by pyrolytic decomposition.

These and other objects, features and advantages of the present invention will be understood in greater detail from the following description and the associated drawings wherein reference numerals are utilized to designate a preferred embodiment.

BRIEF DESCRIPTION OF THE DRAWINGS

FIG. 1 illustrates a tantalum-sinter anode.

FIGS. 2 and 3 illustrate sections from FIG. 1.

FIG. 4 illustrates the manner of contacting of the semiconductive manganese dioxide layer.

DESCRIPTION OF THE PREFERRED EMBODIMENTS

Figure 5:
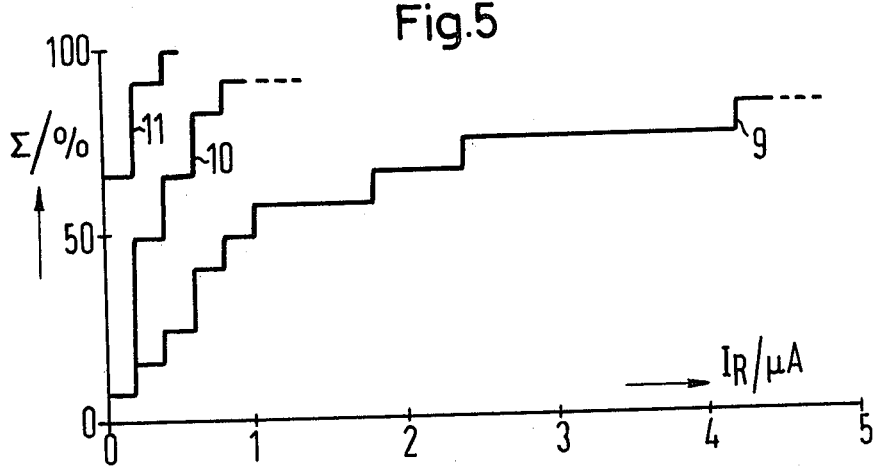
FIG. 5 illustrates the cumulative frequency of the leakage current.

The present invention relates to a solid electrolyte capacitor consisting of a sintered anode made of a film-forming metal; for example, tantalum. The anode is provided with a dielectric oxide layer and the capacitor has a cathode made of a semiconductive metal oxide, particularly manganese dioxide. The capacitor has a graphite layer as a current supply, which graphite layer is provided with a metal layer capable of being soldered, such as a silver layer.

Solid electrolyte capacitors consist of a sintered anode of a film-forming metal (generally tantalum) on which an oxide layer acting as a dielectric is applied by means of an anodizing process. In general, a manganese dioxide layer serves as a cathode, which is obtained by dipping the anodized sintered body into a manganese nitrate solution and a subsequent pyrolysis of the manganese nitrate. In order to improve the cathode layer, dipping in the manganese nitrate solution and subsequent pyrolysis may be carried out repeatedly. A graphite layer is applied on the manganese dioxide layer as a cathodic connection. This is accomplished by means of dipping in a colloidal graphite solution and subsequent drying. It has been proven expedient to treat the manganese dioxide layer in an acetic acid-hydrogen peroxide-bath (German Offenlegungsschrift No. 2,257,063) prior to coating with graphite. Finally, a solderable metal coating (generally silver) is applied onto the graphite layer.

In spite of most careful execution of the individual method steps, it cannot always be avoided that the completed capacitors exhibit unduly high leakage currents or excessively high impedance values or excessively high dissipation factors.

The inventive method for producing a solid electrolyte capacitor of this type is characterized in that—after the sintered anode has been provided with the dielectrically active oxide layer according to a known method, and after the cathode, produced according to a known method, has been provided with a graphite layer—the capacitor member is dipped into a bath one or more times, which contains the metal from which the additional layer is to be created in a pyrolytically decomposable compound. The additional layer is created after the dipping process by means of pyrolytic decomposition, and subsequently the solid electrolyte capacitor is completed according to the known procedures.

FIG. 1 schematically illustrates a coated tantalum sintered anode. It consists of an anodic lead-in wire 1 and sinter member 2. A tantalum pentoxide layer, produced by means of anodic oxidation, is located on tantalum sinter member 2, which layer serves as dielectric of the capacitor. On this dielectric layer, the manganese dioxide layer serving as a cathode is deposited by means of pyrolytic decomposition.

FIGS. 2 and 3 are enlarged illustrations of the edge zone of FIG. 1, where the anodic lead-in wire 1 passes into sinter member 2. In these figures, the tantalum anode 3, the dielectric tantalum pentoxide layer 4, and the cathodic manganese dioxide layer 5 are shown.

FIG. 2 illustrates the conditions in conventional solid electrolyte capacitors, while FIG. 3 illustrates the edge zone of the inventive solid electrolyte capacitor. As can be learned from FIG. 2, in the conventional capacitor there is a very strong distortion of the electric lines of flux 6 in the edge zone; i.e., increased field intensities occur. The consequence thereof are increased leakage currents, which limit the use of the capacitors. In the intermediate form and the final form, the manganese dioxide may indeed pass into a more highly ohmic modification by means of electrothermic reduction, whereby this process is dependent upon current density and therefore preferably occurs on locations of increased field intensity. However, this process cannot be controlled easily, so that a strong dispersion of the leakage currents can occur in spite of this treatment.

On the other hand, FIG. 3 illustrates the conditions in the edge zone of the inventive solid electrolyte capacitor, which has an additional layer 7 consisting of semiconductive metal oxide on its cathodic manganese dioxide layer 5. In order for additional layer 7 to be effective in the manner desired, it must exhibit a higher specific resistance than cathodic manganese dioxide layer 5. Layers consisting of manganese dioxide, lead oxide, zinc oxide, copper oxide, iron oxide, bismuth oxide, manganese-lithium oxide, manganese-zinc oxide, and zinc-lithium oxide have been proven especially favorable. As can be readily learned from FIG. 3, the effect of the inventive additional layer 7 is to bring about decreased distortion of the electric lines of flux 6 in the edge zone, as compared with conventional capacitors. However, this means that the edge field intensity is diminished, and that thus lower leakage currents are to be found. Aside from the decrease in the edge field intensity, the additional layer, simultaneously has a decrease in the edge concentration of free electrons, and thus also a decrease in their injection rate. This also leads to a decrease in the leakage current, since the injection rate, in addition to the field intensity, determines the level of the leakage current.

FIG. 4 depicts a sectional view of the contacting of the cathodic manganese dioxide layer 5 by means of a graphite layer. The graphite layer consists of individual graphite particles 8. While the leakage current is determined by the edge field intensity and the injection rate, the impedance as well as the dissipation factor are mainly dependent on the contacting of the cathodic manganese dioxide layer 5. While, in conventional solid electrolyte capacitors, this contacting was made only where the individual graphite particles 8 were applied to the manganese dioxide layer 5, or between the individual graphite particles 8 (in the figure, two contacts of this type are designated by contact zone $x$), in the inventive solid electrolyte capacitor, these contact surfaces are significantly enlarged by means of additional layer 7 (designated by $y$ in the figure). The inventive solid electrolyte capacitor thereby exhibits much lower impedance values and dissipation factors.

The additional layer 7 is produced by dipping the sinter member in a bath after applying the graphite layer, which bath contains a pyrolyzable salt of the desired metal, and the layer is subsequently produced by means of pyrolysis. The layer density of the additional layer 7 must be measured such that a satisfactory contact of the later with the graphite layer is insured. It is therefore also possible to produce the additional layer 7 only after applying the silver-conductive-lacquer-layer, since, in so doing, the contact between the particles of the graphite layer and the silver layer is improved.

Following are 19 embodiments of the invention:

Embodiment 1

Tantalum solid electrolyte capacitors of nominal data of 23/uF/10 V were provided with an additional layer of zinc oxide. Production of this layer took place by dipping the sinter member which had been provided with a coating of graphite into an 0.4 M zinc nitrate solution, and by means of subsequent pyrolytic decomposition at 250° C for 4 minutes. Further treatment of the capacitors took place in a conventional manner. The mean values (frequency 50%) of dissipation factor, tan $\delta$, (120 Hz) and the apparent impedance Z, (10 kHz) of the capacitors (measured at 25° C) were 1.8% and 1.1 ohm, respectively. The comparative values of the conventional electrolyte capacitors without an additional zinc oxide layer were 2.6% and 1.2 ohm, respectively. The apparent impedance Z, (100 kHz) was improved from 0.52 to 0.34 ohm.

Embodiment 2

Tantalum electrolyte capacitors of the same nominal data as in Embodiment 1 were provided with a zinc oxide additional layer in the same manner, however, the manganese dioxide surface was treated for 15 seconds in an acetic acid-hydrogen peroxide-bath according to German Offenlegungsschrift No. 2,257,063, prior to being coated with graphite. On the completed capacitor, it was possible to determine a further improvement in the dissipation factor to 1.7%, as well as in the impedance Z, (10 kHz) to 0.9 ohm, and Z (100 kHz) to 0.28 ohm.

FIG. 5 indicates the cumulative frequency $\Sigma$ of leakage currents $I_R$ (measured at 25° C for 2 minutes after applying a voltage 1.5 $U_N$) of the capacitors described in Embodiments 2 and 3. For comparison purposes, the cumulative frequency of the leakage current of conventionally produced capacitors is also indicated (Curve 9). Curve 10 relates to capacitors produced according to Embodiment 1, and Curve 11 relates to capacitors produced according to Embodiment 2. As can be learned from FIG. 5, the inventive additional layer results in a significant improvement in the leakage current values, which may be even further improved by treating the manganese dioxide layer prior to the graphite coating process.

Embodiment 3

Tantalum solid electrolyte capacitors of the nominal data 35/uF/10 V were produced with an additional layer of lead oxide, which was produced by dipping the sinter member coated with graphite in a 1 M lead nitrate solution, and a subsequent pyrolysis at 250° C for 4 minutes.

Embodiment 4

Tantalum solid electrolyte capacitors of the same nominal data as in Embodiment 3 were produced with a zinc oxide additional layer by means of dipping in a 1 M zinc nitrate solution, and a subsequent pyrolysis at 250° C for 4 minutes.

Figure 6:
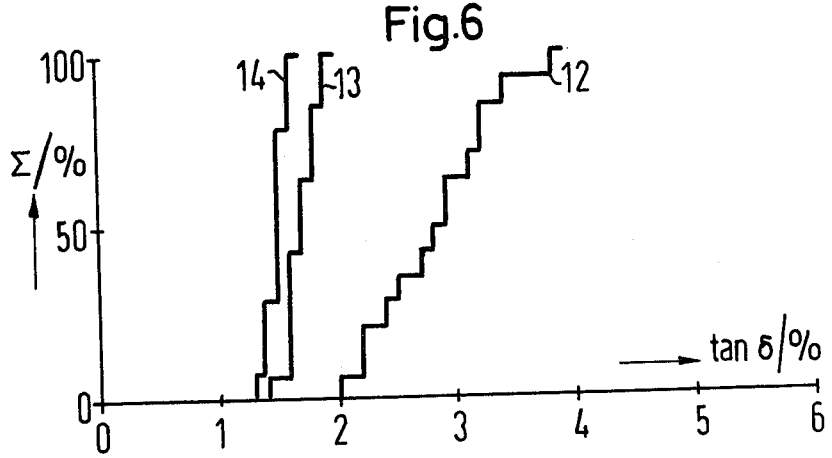
FIG. 6 illustrates the cumulative frequency of the dissipation factor.
Figure 7:
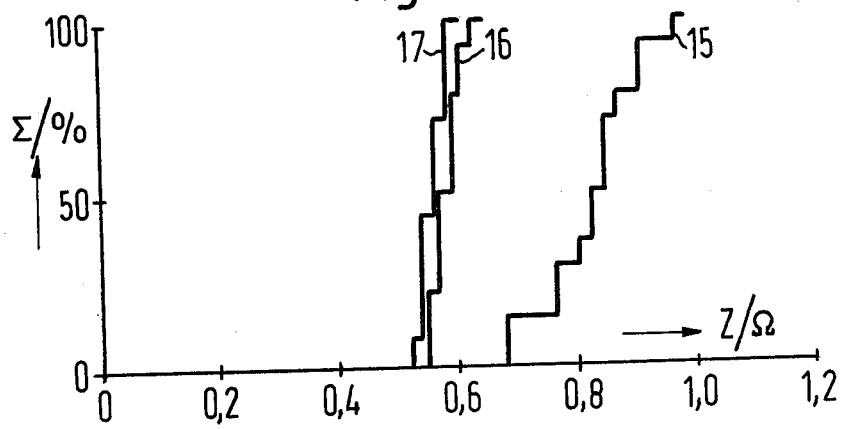
FIG. 7 illustrates the cumulative frequency of the impedance.

FIGS. 6 and 7 indicate that the cumulative frequencies of dissipation factor, tan $\delta$, (120 Hz) and of the impedance Z, (10 kHz) of the tantalum solid electrolyte capacitors produced according to Embodiments 3 and 4. Curves 13 and 16 refer to the capacitors produced according to Embodiment 3, while curves 14 and 17 correspond to capacitors produced according to Embodiment 4. For comparison purposes, the values of conventionally produced capacitors without an additional layer are also listed in FIGS. 6 and 7 (curves 12 or 15). The significant improvement of the inventive capacitors can readily be learned from FIGS. 6 and 7.

Embodiment 5

In the case of tantalum solid electrolyte capacitors of the nominal values 8/uF/35 V, a zinc oxide additional layer was produced by dipping the sinter member coated with graphite in an 0.4 M zinc nitrate solution, and a subsequent pyrolysis at 250° C for 4 minutes. After the final forming (125° C, 35 V, 60 h), the dissipation factor was improved from 2.4% to 1.5%, and the impedance was improved from 2.9 ohms to 2.2 ohms, as compared with known capacitors without an additional layer. With a second charge, improvements in the dissipation factor from 1.8% to 1.0% and in the impedance from 2.6 ohms to 2.1 ohms could be found.

Embodiment 6

After being provided with a coating of graphite, capacitor members similar to those in Embodiment 5 were provided with a lead oxide additional layer by means of dipping in a 0.2 M lead nitrate bath, and a subsequent pyrolysis under the same conditions. After the final forming, improvements in the dissipation factor from 2.4 to 1.6%, as compared with the known capacitors, and improvements in the impedance from 2.9 ohms to 2.3 ohms could be tabulated. In the case of a parallel charge, improvements in the dissipation factor from 1.8% to 1.2% and in the impedance from 2.6 ohms to 2.1 ohms could be found.

Embodiment 7

An iron oxide additional layer was produced on capacitor members similar to those in the foregoing Embodiments 5 and 6 by means of dipping in an 0.2 M iron nitrate solution, and subsequent pyrolysis. After final forming, the dissipation factor was improved from 2.4% to 1.5%, and the impedance was improved from 2.9 ohms to 2.3 ohms.

Embodiment 8

Capacitor members having the same nominal data as in Embodiment 5 were provided with a copper oxide additional layer after having been coated with graphite, which layer was produced by means of dipping the members coated with graphite in a 0.3 M copper acetate bath and a subsequent pyrolysis. After the final forming, the dissipation factor, as compared with known capacitors, was improved from 2.4% to 2.1% and the impedance was improved from 2.9 ohms to 2.7 ohms.

Embodiment 9

Capacitor members having the same nominal data as in Embodiment 5 were provided with a manganese oxide additional layer after having been provided with a graphite coat, which manganese oxide additional layer was produced by means of dipping the member in a 1 M manganese nitrate bath, and subsequent pyrolysis. After final forming, the dissipation factor, compared with known capacitors, was improved from 1.8% to 1.1%, and the impedance was improved from 2.6 ohms to 2.1 ohms.

Embodiment 10

After being provided with a coating of graphite, an additional layer consisting of a manganese-lithium-mixed oxide was applied on capacitor members having the same nominal data as in Embodiment 5. The additional layer was produced by means of dipping the members in an 0.5 M manganese/0.2 M lithium-nitrate bath, and subsequent pyrolysis. After the final forming, an improvement in the dissipation factor from 1.8% to 1.2% and in the impedance from 2.6 ohms to 2.1 ohms could be tabulated in comparison with known capacitors.

Embodiment 11

After being provided with a coating of graphite, capacitors having the same nominal data as in Embodiment 5 were provided with an additional layer consisting of a manganese-zinc oxide, which layer was produced by means of dipping the member in an 0.5 M manganese/0.2 M zinc-nitrate bath, and a subsequent pyrolysis. After final forming, improvements in the dissipation factor from 1.8% to 1.2% and in the impedance from 2.6 ohms to 2.1 ohms could be recorded, in comparison with known capacitors not having an additional layer.

Embodiment 12

Capacitors having the same nominal data as in Embodiment 5 were provided with an additional layer consisting of a zinc-lithium oxide. The additional layer was created by means of dipping the graphitized member in an 0.2 M zinc/0.2 M lithium-nitrate bath, and a subsequent pyrolysis. After final formation, the dissipation factor was improved from 1.8% to 1.0%, and the impedance was improved from 2.6 ohms to 2.0 ohms (compared with known capacitors).

Embodiment 13

Tantalum solid electrolyte capacitors having nominal values 23/uF/10 V were provided with a lead oxide additional layer after having been graphitized. The additional layer was produced by means of dipping the capacitor member in an 0.2 M lead-nitrate bath, and a subsequent pyrolysis. The capacitors produced for purposes of comparison without a lead oxide additional layer exhibited much poorer electric values:

Dissipation factor 2.6% as compared with 1.8%, impedance at 10 kHz, 1.2 ohms as compared with 1.0 ohm, impedance at 100 kHz, 0.52 ohm as compared with 0.32 ohm, leakage current (measured after 2 minutes at 15 V and 25° C), 1.0/uA as compared with 0.4/uA.

Embodiment 14

Capacitors having the same nominal values as in Embodiment 13 were provided with a lead oxide additional layer in the same manner. However, prior to applying the graphite layer, the manganese dioxide surface was treated in an acetic acid—hydrogen peroxide bath—according to the German Offenlegungsschrift No. 2,257,063. Compared with conventional capacitors (without an additional layer and with an untreated manganese dioxide surface) the following improvements in electric values resulted:

Dissipation Factor from 2.6% to 2.2%, impedance at 10 kHz, from 0.52 ohm to 0.28 ohm, leakage current (measured after 2 minutes at 15 V), from 1.0/uA to 0.3/uA.

Embodiment 15

After graphitization, tantalum solid electrolyte capacitors having the nominal data 10/uF/35 V were provided with a bismuth oxide additional layer, which was produced by means of dipping the capacitor members in an 0.5 M bismuth nitrate bath (with $HNO_3$ being adjusted to a pH-value of approximately 1, so that no hydroxide precipitates out) and a subsequent pyrolysis (250° C, 4 minutes). Compared with conventional capacitors without an additional layer, improvements in the dissipation factor from 2 to 1.2% and in the impedance value Z, (10 kHz) from 1.9 ohms to 1.7 ohms could be found.

The influence of the production-sequence of the semiconductive additional layer; namely, 1. Production of the additional layer after graphitization and prior to applying the conductive silver layer, and
2. First graphitization and applying the conductive silver layer, and then the production of the semiconductive additional layer.

On the electric values shall be indicated in the following Embodiments 16 through 19.

Embodiments 16 and 17

A semiconductive zinc oxide additional layer was produced by means of dipping tantalum solid electrolyte capacitors having the nominal data 35/uF/10 V in a 1 M zinc nitrate solution, and subsequent pyrolysis for 4 minutes at 250° C. In the case of production of the additional layer prior to application of the silver conductive lacquer layer, values from 1.5% for the dissipation factor and 0.55 ohm for the impedance at 10 kHz resulted, and when the zinc oxide additional layer was produced after applying the silver conductive lacquer layer, such values of 2.1% and 0.64 ohm respectively resulted. Compared with capacitors produced according to normal methods, which exhibited a dissipation factor of 3.0% and impedance of 0.78 ohm, a definite improvement in the electrical values can be found.

Embodiments 18 and 19

Tantalum solid electrolyte capacitors having the nominal data 35/uF/10 V were provided with a lead oxide additional layer by means of dipping in a 1 M lead nitrate solution and subsequent pyrolysis for 4 minutes at 250° C. In producing the lead oxide additional layer prior to applying the silver conductive lacquer layer, a dissipation factor of 1.8% and an impedance of 0.57 ohm were obtained, and introducing the lead oxide layer after applying the silver conductive lacquer layer, values of 2.0% and 0.65 ohm respectively were obtained. Compared with the values of tantalum solid electrolyte capacitors produced according to normal methods (see sample Embodiments 15 and 16), an improvement in these electrical values can be determined even in the case of a lead oxide additional layer, without regard for whether its production has been carried out prior to or subsequent to applying the silver conductive lacquer layer.

The thickness of additional layer 7, if dipped once, essentially depends upon the concentration of the bath. Favorable bath concentrations lie approximately between 0.2 M and 1.5 M. This applied to the case in which the additional layer is produced prior to applying the silver conductive lacquer layer, since, in this case, too great a thickness of the additional layer causes one to expect difficulties in the contacting on the border area between the graphite and silver. If additional layer 7 is produced only after applying the silver conductive lacquer layer, it is possible then to work with bath concentrations higher than 1.5 M. Additional layer 7 may also consist of semiconductive metal oxides other than those cited, if these fulfill the requirement that their specific resistances be higher than that of the cathodic manganese dioxide layer.

I claim:

1. A solid electrolyte capacitor comprising:
   a sintered anode of film-forming metal, said anode being coated with a dielectric active oxide layer,
   a cathode formed on said dielectric active oxide layer oppositely of said anode,
   said cathode consisting of a semiconductive metal oxide,
   a graphite layer including graphite particles disposed on said cathode, and
   an additional semiconductive metal oxide layer with higher specific resistance than said cathode disposed on said cathode adjacent to and in between the graphite particles of said graphite layer.

2. A solid electrolyte capacitor according to claim 1, wherein said additional layer is formed of manganese dioxide.

3. A solid electrolyte capacitor according to claim 1 wherein said additional layer is formed of lead oxide.

4. A solid electrolyte capacitor according to claim 1 wherein said additional layer is formed of zinc oxide.

5. A solid electrolyte capacitor according to claim 1 wherein said additional layer is formed of iron oxide.

6. A solid electrolyte capacitor according to claim 1 wherein said additional layer is formed of copper oxide.

7. A solid electrolyte capacitor according to claim 1 wherein said additional layer is formed of bismuth oxide.

8. A solid electrolyte capacitor according to claim 1 wherein said additional layer is formed of a semiconductive mixed oxide consisting of manganese oxide and lithium oxide.

9. A solid electrolyte capacitor according to claim 1 wherein said additional layer is formed of a semiconductive mixed oxide consisting of manganese oxide and zinc oxide.

10. A solid electrolyte capacitor according to claim 1 wherein said additional layer is formed of a semiconductive mixed oxide consisting of zinc oxide and lithium oxide.

* * * * *